United States Patent [19]

Matsumura

[11] Patent Number: 5,105,620

[45] Date of Patent: Apr. 21, 1992

[54] SECONDARY AIR SUPPLY SYSTEM FOR SUPERCHARGED ENGINE

[75] Inventor: Motohiro Matsumura, Kanagawa, Japan

[73] Assignee: Nissan Motor Co., Ltd., Yokohama, Japan

[21] Appl. No.: 648,295

[22] Filed: Jan. 30, 1991

[30] Foreign Application Priority Data

Feb. 28, 1990 [JP] Japan .................. 2-19818[U]

[51] Int. Cl.$^5$ ................. F01N 3/22; F02B 37/00
[52] U.S. Cl. ..................... 60/290; 60/280; 60/293
[58] Field of Search .............. 60/293, 290, 280

[56] References Cited

U.S. PATENT DOCUMENTS

| | | | |
|---|---|---|---|
| 3,906,722 | 9/1975 | Garcea | 60/293 |
| 4,246,752 | 1/1981 | Tryon | 60/280 |
| 4,534,173 | 8/1985 | Tsukamoto | 60/293 |

FOREIGN PATENT DOCUMENTS

| | | | |
|---|---|---|---|
| 53-76217 | 7/1978 | Japan . | |
| 93919 | 7/1980 | Japan | 60/280 |
| 58-172415 | 10/1983 | Japan . | |

Primary Examiner—Douglas Hart
Attorney, Agent, or Firm—Foley & Lardner

[57] ABSTRACT

A secondary air supply system for a supercharged engine includes a control valve which controls a diaphragm-operated valve. The control valve with solenoid is electrically controlled according to various engine operating conditions. The diaphragm-operated valve tightly closes the secondary air supply passage to prevent exhaust gas from flowing into the intake passage through the secondary air supply passage under a high engine load and high engine speed condition. The diaphragm-operated valve opens the secondary air supply passage to allow air to be supplied into the exhaust gas under a low engine load and low engine speed condition.

7 Claims, 3 Drawing Sheets

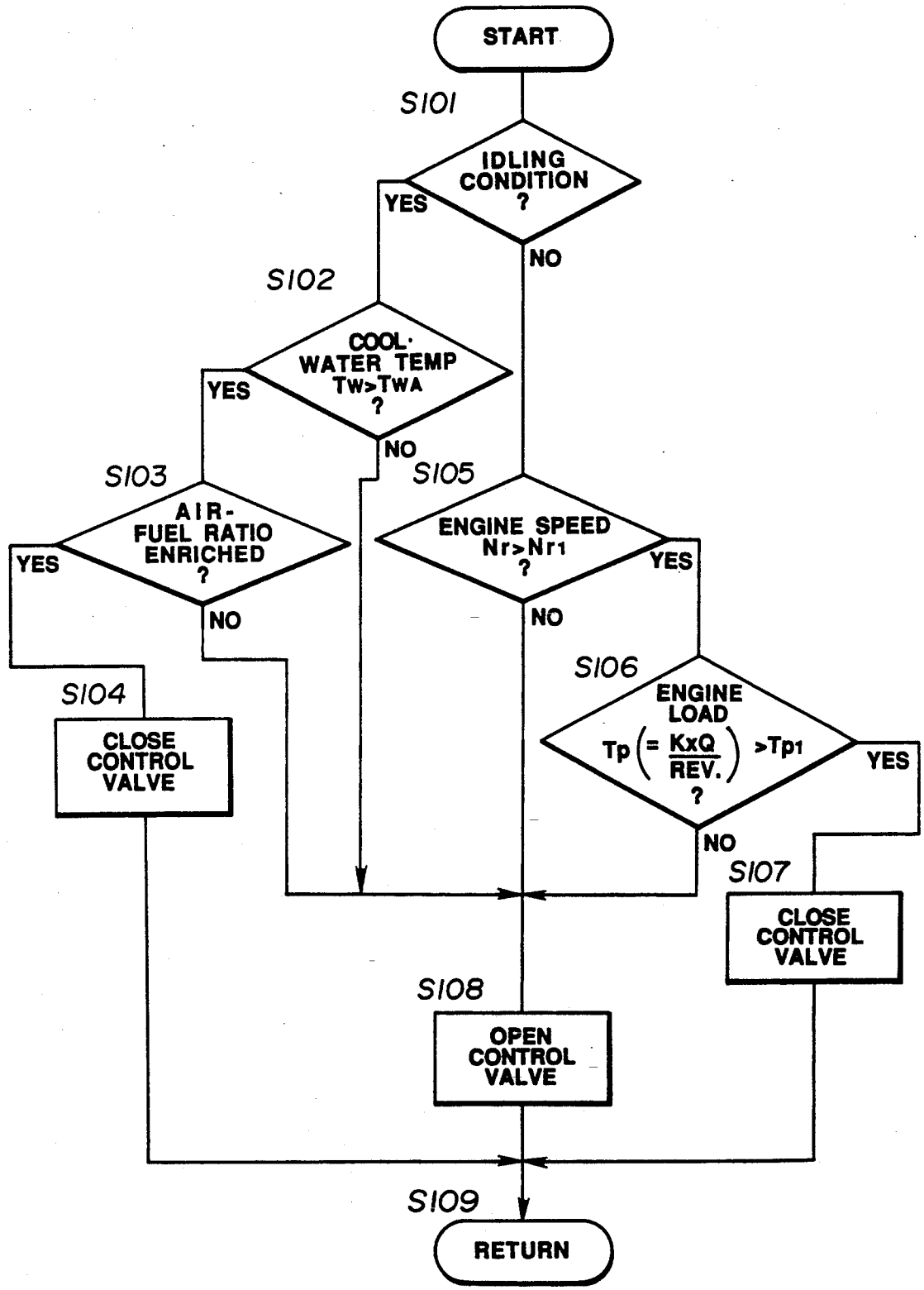

SECONDARY AIR SUPPLY SYSTEM FOR SUPERCHARGED ENGINE

BACKGROUND OF THE INVENTION

1. Field of the Invention

The present invention relates to improvements in a secondary air supply system which is used in a supercharged engine, and more particularly to such a secondary air supply system which improves engine performance in a high engine load and high engine speed condition.

2. Description of the Prior Art

It is well known to use a three-way catalytic converter (a device which is capable of simultaneously reducing the concentrations of CO, HC and $NO_x$ in the exhaust gases) in the exhaust system of automotive engines. Such a conventional system, however, cannot efficiently convert CO and $NO_x$ when an enriched air/fuel mixture is supplied to the engine under an idling condition. To efficiently convert the exhaust gases under the idling condition, it has been proposed that the exhaust system be provided with a secondary air supply arrangement wherein secondary air is supplied into the exhaust gases under an idling condition. Such an arrangement is disclosed, for example, in Japanese Patent Provisional Publication Nos. 53-76217 and 58-172415. The secondary air supply arrangement includes a diaphragm valve which opens a secondary air supply passage so that secondary air is supplied into the exhaust gases under an idling condition. The arrangement further includes a reed valve which operates to guide the secondary air into the exhaust gases under the pulsation of the exhaust gas.

However, when this conventional arrangement is used in a supercharged engine, a problem arises because the exhaust gas flows into the intake passage through the secondary air supply passage under a high engine load and high engine speed condition. This occurs sealing performance of the reed valve being not very good, the arrangement cannot prevent the exhaust gas from leaking at the reed valve. The diaphragm-operated valve is opened by communication between the pressure chamber of the diaphragm-operated valve and negative pressure in the intake passage, thereby guiding secondary air into the exhaust gas. The diaphragm-operated valve is closed by communication between the pressure chamber and the atmosphere under other than the high load and speed condition. Therefore, under a high pressure condition of the exhaust gas such as a high engine load and high engine speed condition, the exhaust gas leaking from the reed valve pushes and opens the diaphragm-operated valve. Furthermore, the exhaust gas flows into the engine through the air cleaner, thereby degrading the engine performance under a high engine load and high engine speed condition.

SUMMARY OF THE INVENTION

It is an object of the present invention to provide a secondary air supply system to improve the performance of a supercharged engine under a high engine load and high speed revolution condition, while also providing an improved secondary air supply system whereby secondary air is led into the exhaust gas under a predetermined low engine load and low speed revolution condition.

A secondary air supply system for an internal combustion engine with a supercharger of, according to the present invention, comprises a secondary air supply passage which communicates with intake and exhaust passages of the engine. A reed valve is disposed in said secondary air supply passage and operated so that air in the intake passage is supplied into the exhaust gas in the exhaust passage. A diaphragm-operated valve is disposed in the secondary air supply passage and has a pressure chamber defined by a diaphragm. The diaphragm-operated valve opens the secondary air supply passage in a first state when the pressure chamber is supplied with negative pressure from the intake passage. In a second state the secondary air supply passage is closed and exhaust gas is prevented from flowing from the exhaust passage to the intake passage through the secondary air supply passage. The second state occurs when the pressure chamber is supplied with positive pressure developed by the supercharger in the intake passage. A third state also closes the secondary air supply passage when the pressure chamber is supplied with atmospheric pressure. A valve means is operatingly connected to the diaphragm-operated valve and in a first state allows the pressure chamber to be supplied with negative pressure, in a second state allows the pressure chamber to be supplied with positive pressure, and in a third state allows the pressure chamber to be supplied with atmospheric pressure. A valve means controlling means puts the valve means into one of the first state in a first engine operating condition, the second state in a second engine operating condition in which engine load and engine speed are higher than those in the first condition, and the third state in a third engine operating condition in which the engine load and the engine speed are other than those in the first and second engine operating conditions.

With this arrangement, the diaphragm-operated valve tightly closes the secondary air passage under a high engine load and high engine speed condition so that the exhaust gas is prevented from flowing into the engine through the intake passage. Therefore, the supercharged engine has improved power performance under a high engine load and high engine speed condition, while secondary air is supplied into exhaust gas under a predetermined low engine load and low engine speed condition such as an idling condition.

BRIEF DESCRIPTION OF THE DRAWING

FIG. 3 is a flowchart showing a program of the system according to the present invention.

DETAILED DESCRIPTION OF THE INVENTION

Figure 1:
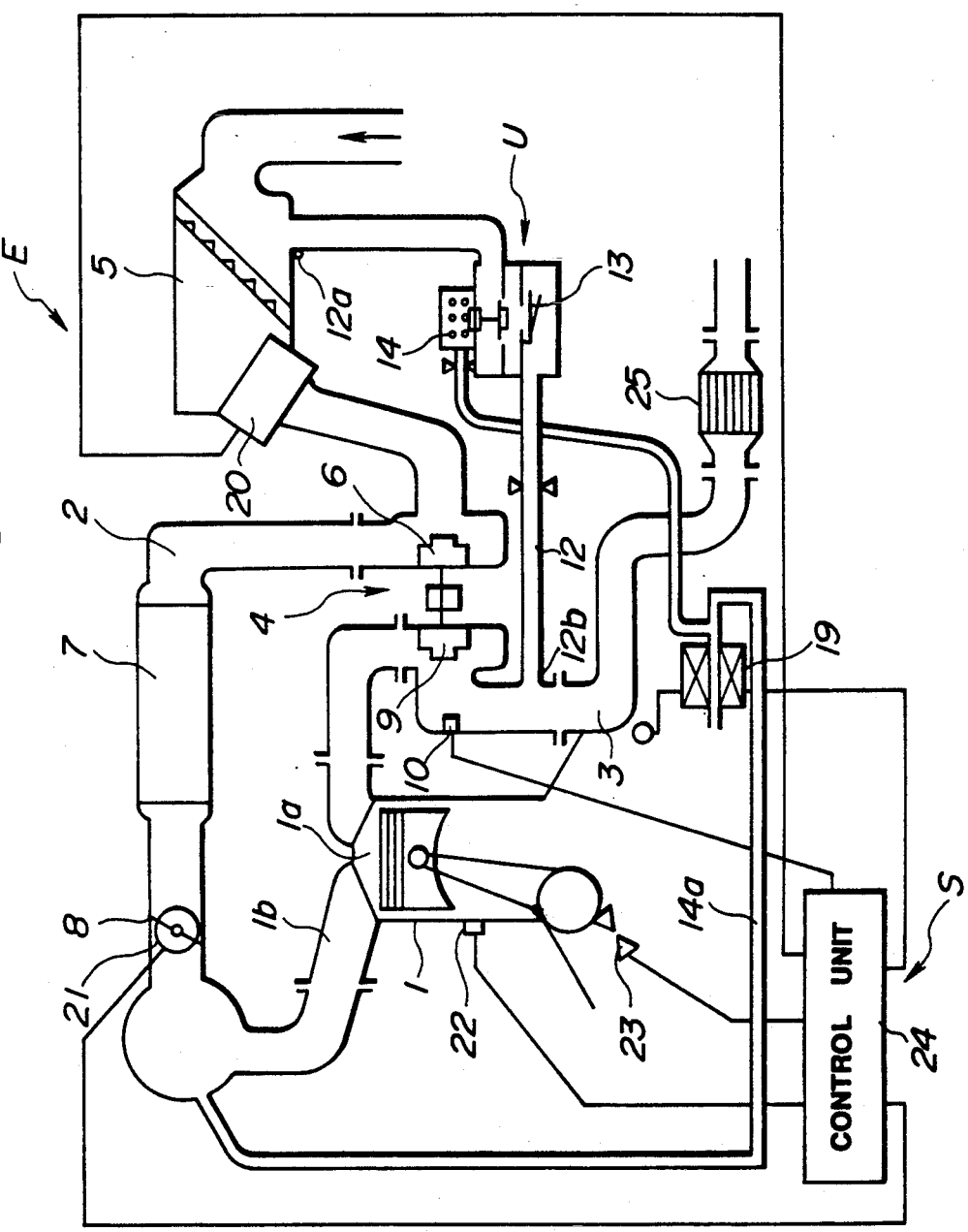
FIG. 1 is a schematic view of an engine system including a secondary air supply system according to the present invention.

Referring now to FIGS. 1 to 4, an embodiment of a secondary air supply system according to the present invention is illustrated by the reference character S. The secondary air supply system S is, in this embodiment, installed in an internal combustion engine system E of an automotive vehicle (not shown). The internal combustion engine system E includes an internal combustion engine 1 equipped with a turbocharger 4 which has an intake compressor 6 and an exhaust turbine 9. A combustion chamber (or combustion chambers) 1a of the internal combustion engine 1 is communicable with an intake passage 2 and an exhaust passage 3 as usual.

An air cleaner 5 is disposed in the intake passage 2 at a portion near its upstream end. The intake compressor 6 is disposed in the intake passage 2 downstream of the air cleaner 5. An inter cooler 7 for cooling compressed intake air is disposed in the intake passage 2 downstream of the intake compressor 6. A throttle valve 8 and a fuel injection valve (not shown) are disposed in the intake passage 2 downstream of the inter cooler 7. An intake manifold 1b is disposed in the intake passage 2 to be connected with the combustion chamber 1a. In the exhaust passage 3, the exhaust turbine 9 is disposed downstream of the engine combustion chamber 1a. An oxygen sensor 10 is disposed downstream of the exhaust turbine 9. A three-way catalytic converter 25 is disposed downstream of the oxygen sensor 10.

A secondary air supply passage 12 has an upstream end 12a and a downstream end 12b. The upstream end 12a is communicated with the intake passage 2 upstream of the air cleaner 5. The downstream end 12b is communicated with the exhaust passage 3 upstream of the three-way catalytic converter 25.

Figure 2:
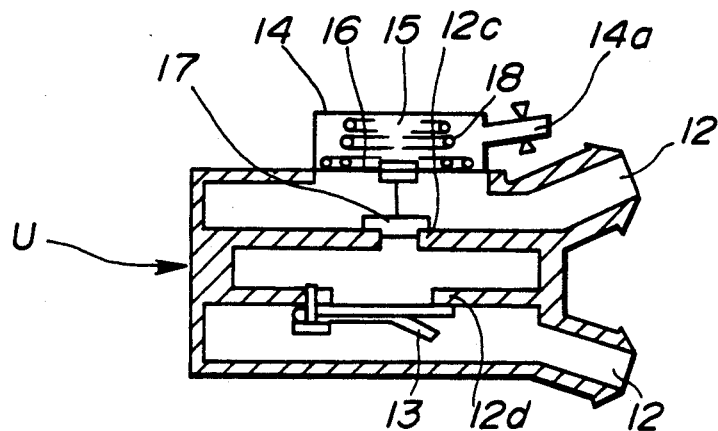
FIG. 2 is a cross-sectional view of a valve unit of the secondary air supply system of FIG. 1.

A diaphragm-operated valve 14 is disposed in the secondary air passage 12 to close the secondary air supply passage 12. As shown in FIG. 2, the diaphragm-operated valve 14 includes a diaphragm 16 which defines a pressure chamber 15. A valve member 17 is connected to the diaphragm 16 and disposed to close an opening (no numeral) defined by a valve seat 12c, whereby the opening forms part of the secondary air passage 12. A spring 18 is disposed in the pressure chamber 15 to bias the diaphragm 16.

The secondary air supply passage 12 has a reed valve 13 which opens and closes an opening (no numeral) defined by a valve seat 12d, whereby the opening forms part of the secondary air supply passage 12. The opening and closing action of the reed valve 13 is caused by the pulsation of exhaust gas in the exhaust passage 3 so that secondary air in the intake passage 2 is supplied into the exhaust gases in the exhaust passage 3. The reed valve 13 and the diaphragm-operated valve 14 are assembled to form a valve unit U as shown in FIG. 2 so that the reed valve 13 is located downstream of the diaphragm-operated valve 14. A control passage 14a communicates with the pressure chamber 15 and the intake passage 2 downstream of the throttle valve 8. When negative pressure (vacuum) is supplied to the pressure chamber 15 through the control passage 14a, the valve member 17 is lifted up and the secondary air supply passage 12 is opened. When positive pressure or atmospheric pressure is supplied to the pressure chamber 15, the valve member 17 closes the secondary air supply passage 12.

A control valve 19 is arranged to be opened when a solenoid thereof is energized and to be closed when the solenoid is de-energized. The control valve 19 is installed for the control passage 14a so that the pressure chamber 15 is communicated with atmosphere when the control valve 19 is opened. Therefore, when the control valve 19 is closed, the intake air pressure in the intake passage 2 is supplied to the pressure chamber 15. When the control valve 19 is opened, atmospheric pressure is supplied to the pressure chamber 15.

Figure 4:
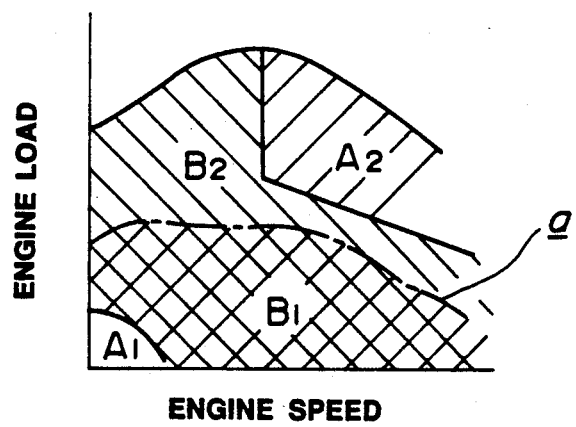
FIG. 4 is a graph showing an operating condition of a control valve of the secondary air supply system in accordance with the engine condition.

An air flow sensor 20 is disposed in the intake passage 2 downstream of the air cleaner 5 in order to detect the intake air flow rate of the engine 1. Furthermore, the engine 1 is provided with a throttle-position sensor 21 for detecting an opening angle or throttle position of the throttle valve 8. A water temperature sensor 22 is installed on the engine 1 to detect the temperature of the cooling water in the engine 1. An engine speed sensor 23 is installed on the engine 1 to detect the engine speed of the engine 1. A control unit 24 for controlling the control valve 19 is electrically connected to the control valve 19, the air flow sensor 20, the throttle sensor 21, the water temperature sensor 22 and the engine speed sensor 23. Therefore, the control unit 24 operates in response to the signals detected by the sensors 20, 21, 22 and 23 so that the exhaust gas condition is controlled adequately. Thus, when the engine 1 operates under a predetermined low engine load and low engine speed condition or a high engine load and high engine speed condition, the control valve 19 is closed so that the pressure chamber 15 communicates with the intake passage 2 downstream of the throttle valve 8. The engine load is represented by an equation ($K \times Q$/Rev.) where K is a predetermined value, Q is the air flow rate and Rev. is the engine speed. When the engine 1 operates under another condition such as a partial engine load condition, the control valve 19 is opened so that the pressure, chamber 15 communicates with the atmosphere. The operation of the control valve 19 corresponding to the engine operating condition is shown in the graph of FIG. 4. In the graph, a zone $A_1$ represents the low engine load and low engine speed condition in which the control valve 19 is closed. A zone $A_2$ represents the high engine load and high engine speed condition in which the control valve 19 is closed. Zones $B_1$ and $B_2$ represent the other engine operating condition in which the control valve is opened. A line a represents an engine operating condition under which a pressure in the intake manifold 1b is held at 0 mmHg.

Under a normal operating condition of the engine 1, the control unit 24 controls fuel injection amounts in response to the signals from the sensors 20, 21, 22 and 23 so that the air/fuel mixture for the engine 1 is controlled in a predetermined (stoichiometric) air/fuel ratio. Under an idling condition or the like of the engine 1, the amount of injected fuel is controlled so that the air/fuel ratio is enriched over the stoichiometric air/fuel ratio.

The manner of operation of the thus arranged secondary air supply system S will be discussed hereinafter with reference to the flowchart of FIG. 3.

When it is judged in a step S101 that the engine 1 is under an idling condition, the flow goes to a step S102. When it is judged in a step S102 that a temperature $T_w$ of the cooling water in the engine 1 is higher than a predetermined level $T_{wa}$, the flow goes to a step S103. When it is judged in the step S103 that the engine 1 is under an air/fuel ratio condition enriched over the stoichiometric ratio, the flow goes to a step S104. In the step S104, the control valve 19 is closed.

When it is judged in the step S101 that the engine 1 is not under the idling condition, the flow goes to a step S105. When it is judged in the step S105 that an engine speed $N_r$ is higher than a predetermined value $N_{r1}$, the flow goes to a step S106. When it is judged in the step S106 that the engine load $T_p$ ($K \times Q$/Rev.) is higher than a predetermined value $T_{p1}$, the flow goes to a step S107. In the step S107, the control valve 19 is closed.

Further, when it is judged in the step S102 that the cooling water temperature $T_w$ is not higher than the level $T_{wa}$, the flow goes to a step S108. In the step S108, the control valve 19 is opened. Similarly, when it is judged in the step S103 that the air/fuel ratio is not enriched over the stoichiometric air/fuel ratio, the flow goes to the step S108. When it is judged in the step S105 that the engine speed $N_r$ is not higher than the value $N_{r1}$, the flow goes to the step S108. When it is judged in the step S106 that the engine load $T_p$ is not higher than the value $T_{p1}$, the flow goes to the step S108.

With the thus arranged system, when the control valve 19 is closed under the low engine load and low engine speed condition within the zone $A_1$, the pressure chamber 15 is communicates with the intake passage 2 downstream of the throttle valve 8 so that the diaphragm-operated valve 14 opens the secondary air supply passage 12.

When the control valve 19 is opened under a partial-load condition within the zone B, the pressure chamber 15 is communicated with atmosphere so that the diaphragm-operated valve 14 closes the secondary air supply passage 12. Since exhaust gas pressure in the exhaust passage 3 is not so high under the partial engine load or the like condition of the engine 1, the exhaust gas does not flow into the secondary passage 12.

When the control valve 19 is closed under a high engine load and high engine speed condition within the zone $A_2$, the pressure chamber 15 communicates with the intake passage 2 so that a positive pressure caused by the turbocharger 4 communicates with the pressure chamber 15. Accordingly, the diaphragm-operated valve 14 is operated so that the valve member 17 tightly closes the secondary air supply passage 12, even though high exhaust pressure is applied to the valve member 17 through the reed valve 13. Therefore, the exhaust gas cannot flow into the intake passage 2, thereby maintaining a high power performance of the engine 1.

When the pressure chamber 15 of the diaphragm valve 14 communicates with the atmosphere under a partial engine load condition of the engine 1, the secondary air supply passage 12 is closed by the valve member 17. However, if the engine 1 is operated so that the intake pressure is under a negative pressure condition and not under the low engine load and low engine speed condition, for example, under a condition within the zone $B_1$ in FIG. 4, the pressure chamber 15 may be communicated with the intake passage 2.

What is claimed is:

1. A secondary air supply system for an internal combustion engine with a supercharger, comprising:
   means for defining a secondary air supply passage which communicates with intake and exhaust passages of the engine;
   a reed valve disposed in said secondary air supply passage, said reed valve being operated so that air in the intake passage is supplied into exhaust gas in the exhaust passage;
   a diaphragm-operated valve disposed in said secondary air supply passage and having a pressure chamber defined by a diaphragm, said diaphragm-operated valve opening said secondary air supply passage in a first state when the pressure chamber is supplied with negative pressure from the intake passage, closing said secondary air supply passage in a second state when the pressure chamber is supplied with positive pressure from the intake passage, said positive pressure being developed by the supercharger, and closing said secondary air supply passage in a third state when the pressure chamber is supplied with atmospheric pressure;
   valve means operatively connected to said diaphragm-operated valve whereby in said first state said pressure chamber is supplied with the negative pressure, in said second state said pressure chamber is supplied with the positive pressure, and in said third state said pressure chamber is supplied with atmospheric pressure; and
   means for controlling said valve means to put said valve means into said first state in a first engine operating condition, said second state in a second engine operating condition in which an engine load and an engine speed are higher than those in said first condition, and said third state in a third engine operating condition in which said engine load and said engine speed are other than those in said first and second engine operating conditions.

2. A secondary air supply system as claimed in claim 1, wherein said first engine operating condition is a low engine load and low engine speed condition, and said second engine operating condition is a high engine load and high engine speed condition.

3. A secondary air supply system as claimed in claim 2, wherein said low engine load and low engine speed condition is an idling condition.

4. A second air supply system as claimed in claim 1, wherein said diaphragm-operated valve includes a valve seat defining an opening forming part of the secondary air supply passage, a valve member fixedly connected to said diaphragm and being seatable on said valve seat to close the opening, said valve member being adapted to separate from said valve seat when said pressure chamber is supplied with the negative pressure and to be forced on said valve seat when said pressure chamber is supplied with the positive pressure, and a spring for biasing said valve member on said valve seat so that said valve member is seated on said valve seat when said pressure chamber is supplied with atmospheric pressure.

5. A secondary air supply system as claimed in claim 1, wherein said controlling means includes means for detecting said engine load and said engine speed and generating first, second and third electrical signals respectively corresponding to said first, second and third engine operating conditions, and a control unit electrically connected to said detecting means and adapted to put said valve means into said first, second and third states respectively in response to said first, second and third electrical signals.

6. A secondary air supply system as claimed in claim 1, further comprising a three-way catalytic converter disposed in the exhaust passage downstream of a portion communicated with said secondary air supply passage.

7. A secondary air supply system as claimed in claim 1, wherein said pressure chamber is communicated with a part of the intake passage located downstream of a throttle valve of the engine.

* * * * *